US009001116B2

(12) United States Patent
Ben-David et al.

(10) Patent No.: US 9,001,116 B2
(45) Date of Patent: Apr. 7, 2015

(54) METHOD AND SYSTEM OF GENERATING A THREE-DIMENSIONAL VIEW OF A REAL SCENE FOR MILITARY PLANNING AND OPERATIONS

(75) Inventors: Amit Ben-David, Haifa (IL); Omri Peleg, Mevaseret Zion (IL); Gil Briskin, Givat Zeev (IL); Eran Shimonovitch, Rishon Lezion (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 269 days.

(21) Appl. No.: 13/512,599

(22) PCT Filed: Nov. 30, 2010

(86) PCT No.: PCT/IB2010/055492
§ 371 (c)(1),
(2), (4) Date: May 30, 2012

(87) PCT Pub. No.: WO2011/067713
PCT Pub. Date: Jun. 9, 2011

(65) Prior Publication Data
US 2013/0009950 A1 Jan. 10, 2013

(30) Foreign Application Priority Data
Dec. 1, 2009 (IL) .......................................... 202460

(51) Int. Cl.
*G06T 15/00* (2011.01)
*G06T 17/05* (2011.01)
*G06T 15/04* (2011.01)

(52) U.S. Cl.
CPC ................. *G06T 17/05* (2013.01); *G06T 15/04* (2013.01)

(58) Field of Classification Search
CPC ................................ G06T 17/05; G06T 15/04
USPC .................................. 345/419, 633; 348/143
See application file for complete search history.

(56) References Cited

U.S. PATENT DOCUMENTS

| 5,850,352 | A | 12/1998 | Moezzi et al. |
|---|---|---|---|
| 7,286,143 | B2 | 10/2007 | Kang et al. |
| 7,471,292 | B2 | 12/2008 | Li |
| 7,583,275 | B2 * | 9/2009 | Neumann et al. ............. 345/633 |

(Continued)

OTHER PUBLICATIONS

Amit Ben-David "View-dependent texture mapping for urban scenes",-Technion-Israel Institute of Technology, Haifa, Jul. 2009, pp. 1-94 Enclosed Please Find the Article on the CD (for Security Reasons).

(Continued)

*Primary Examiner* — Phu K Nguyen
(74) *Attorney, Agent, or Firm* — Mark M. Friedman

(57) ABSTRACT

Generation of views of a real scene is based on selection of view criteria and the content of multiple types of source data. The viewpoint and at least one other criterion area used to determine which texture to sue for each surface, or portion of a surface, of a three-dimensional model. Regions of the images of the scene are associated with at least one portion of at least one surface of the three-dimensional model of the scene, wherein at least one of the portions is associated with the regions of at least two of the images. View selection criteria includes a criterion other than viewpoint. Based on the view selection criteria, selecting at least one of the regions for at least one of the portions and rendering a multi-view using the selected regions in combination with the three-dimensional model of the scene.

20 Claims, 4 Drawing Sheets

(56) References Cited

U.S. PATENT DOCUMENTS 8,527,340 B2 * 9/2013 Fisher et al. ................. 705/14.4
8,711,217 B2 * 4/2014 Venetianer et al. ........... 348/143

OTHER PUBLICATIONS

Microimages, Inc:" Tutorial :Using TNTsim3D for Windows" Oct. 18, 2008, pp. 1-36.

* cited by examiner

METHOD AND SYSTEM OF GENERATING A THREE-DIMENSIONAL VIEW OF A REAL SCENE FOR MILITARY PLANNING AND OPERATIONS

FIELD OF THE INVENTION

The present embodiment generally relates to the fields of computer graphics and computer vision and in particular, it concerns generating a three-dimensional view of a real scene, based on criteria other than just point of view, for military planning and operations.

BACKGROUND OF THE INVENTION

In the fields of computer graphics and computer vision, generating views of scenes for users has many applications. One or more cameras, or more generally image capture devices, can capture images of a real scene for display to a user. Referring to FIG. 1A, image capture of a real scene, multiple cameras (100, 102, and 104) are used in this example to capture images of a real scene, in this case a section of a city 106. In some applications, the user desires to view the scene from an angle other than the angle from which the original images were captured. A variety of conventional techniques exists for generating views from a new angle, also known as a virtual location, or virtual camera angle.

U.S. Pat. No. 7,286,143 to Kang, et al for Interactive viewpoint video employing viewpoints forming an array is related to the generation and rendering of video, and more particularly to a system and process for generating and rendering an interactive viewpoint video in which a user can watch a dynamic scene while changing the viewpoint at will. This patent teaches using static cameras to capture visible images, and a user can select a viewpoint from which a view is rendered of the original scene.

U.S. Pat. No. 7,471,292 to Li for Virtual view specification and synthesis in free viewpoint is a system that receives a first video stream of a scene having a first viewpoint and a second video stream having a second viewpoint wherein camera calibration between the first viewpoint and the second viewpoint is unknown. A viewer selects a viewpoint generally between the first viewpoint and the second viewpoint, and the system synthesizes a view from the selected viewpoint based upon the first video stream and the second video stream. This patent teaches a framework for the rendering problem in free viewpoint television (FTV) based on image-based rendering (IBR) and generates a view from the video streams without the use of a model.

One of the challenges in generating new views from images is accurately rendering the objects in the view from a new (virtual) camera angle. Using a three-dimensional model of the scene to be rendered is a known method for improving view generation. Techniques for using a three-dimensional model to facilitate the generation of views of a scene are known in the industry. See for example, U.S. Pat. No. 5,850,352 to Saied Moezzi et al for Immersive video, including video hypermosaicing to generate from multiple video views of a scene a three-dimensional video mosaic from which diverse virtual video scene images are synthesized including panoramic, scene interactive and stereoscopic images. This patent teaches synthesizing diverse spatially and temporally coherent and consistent virtual video cameras, and corresponding virtual video images, from multiple real video images that are obtained by multiple real video cameras. Video images of selected objects are tracked in a three-dimensional model of the scene for synthesizing the virtual video images. A user can select both a viewpoint (for example location) and type of display (for example panoramic or stereoscopic) virtual video.

One of the challenges of rendering a view from a three-dimensional model is texture mapping. Each surface, or polygon, or a three dimensional model needs to be rendered in some level of detail, depending on the application. A basic technique for static texture mapping is to use one of the original images as a texture source. Referring to FIG. 1B, an example of image to model registration, the original image is registered to the three-dimensional model. For each surface of the three-dimensional model to be rendered, a portion of the image corresponding to the surface is used to render the texture for that surface. A limitation of static texture mapping can be seen from the example of areas where there are unmodelled geometry, such as trees, satellite dishes, and projections from buildings. In cases such as these, static texture mapping smears the texture on the plane in the background of the unmodelled geometry. Refer to FIG. 1C, a rendering using static texture mapping, for an example showing smearing of textures.

Unlike standard texture mapping, where the texture is "pasted" on the 3D surface, a technique known as view dependant texture mapping (VDTM) is used to create a photorealistic view based on real images (photographs) of a scene and a three-dimensional model of the scene. This technique uses texture projection to map the texture for each surface and selects the texture based on the viewpoint and other criteria. Texture projection is a technique that uses the camera model of the photograph (commonly a pinhole camera model) to create a projective transformation that is then used to project/transform a world coordinate to an image/texture coordinate. The main difference between standard texture mapping and view dependent texture projection is that standard texture mapping is static, meaning that for every fragment the texture is predefined before rendering, irrespective of the viewpoint. In View Dependent Texture Projection Mapping, the texture is chosen on the fly for each surface, or portion of a surface, and is done during rendering based on a number of heuristics that take the viewpoint into account. This technique reduces the smearing effect where there is unmodelled geometry on a surface. Refer to FIG. 1D, a rendering using VDTM, for an example showing improvement in texture mapping over static texture mapping.

Refer to the research thesis *View-Dependent Texture Projection Mapping for Urban Scenes* by Amit Ben-David, Technion—Israel Institute of Technology, Haifa, July 2009 for further background information and descriptions of implementations of techniques mentioned in this document.

While conventional methods and systems allow selection of viewpoints and display types, for military planning, military operations, and similar applications, it is desirable to have additional view selection criteria. In particular, given a set of view selection criteria, it is desirable to provide a view generated from multiple media and temporal sources that gives the best result for the given view selection criteria.

SUMMARY

According to the teachings of the present embodiment there is provided, a method for rendering views, including the steps of: a plurality of images of a scene; providing a three-dimensional model of the scene; associating regions of the images of the scene with at least one portion of at least one surface of the three-dimensional model of the scene, wherein at least one of the portions is associated with the regions of at least two of the images; providing at least one view selection criterion, wherein the view selection criteria includes a criterion other than viewpoint; selecting, based on the view selection criteria, at least one of the regions for at least one of the portions; and rendering a multi-view using the selected regions in combination with the three-dimensional model of the scene.

In an optional embodiment, providing a plurality of images of a scene includes providing still images. In another optional embodiment, providing a plurality of images of a scene includes providing video images. In another optional embodiment, providing a plurality of images of a scene includes providing visible images. In another optional embodiment, providing a plurality of images of a scene includes providing infrared (IR) images. In another optional embodiment, providing a plurality of images of a scene includes providing two-dimensional images. In another optional embodiment, providing a plurality of images of a scene includes providing three-dimensional images. In another optional embodiment, providing a three-dimensional model of a scene includes generating a three-dimensional model of the scene using the plurality of images of a scene.

In an optional embodiment, associating each of the regions of the images of the scene with at least one portion of at least one surface of the three-dimensional model of the scene further includes registering the plurality of images of a scene to the three-dimensional model of the scene. In another optional embodiment, registering the plurality of images of a scene to the three-dimensional model of the scene further includes determining the camera angle for each of the images.

In an optional embodiment, features are derived from the plurality of images of a scene and the three-dimensional model of the scene to generate one or more maps, and rendering a multi-view further includes using the maps in combination with the three-dimensional model of the scene to render the multi-view. In another optional embodiment, the maps include a depth map. In another optional embodiment, the maps include an occlusion map. In another optional embodiment, the maps include a silhouette map.

An optional embodiment includes providing a collection of information, other than the plurality of images of a scene, as an information layer and further including using the information layers in combination with the multi-view to generate a combined-view. In another optional embodiment, the information layer includes a computer vision layer calculated from the features from the plurality of images of a scene and the three-dimensional model of the scene. In another optional embodiment, the information layer includes a dynamic vector layer, the dynamic vector layer including information associated with the scene.

According to the teachings of the present embodiment there is provided, a system for rendering views, including: one or more image providing devices configured for providing a plurality of images of a scene; a storage system; a processing system containing at least one processor configured for: providing a three-dimensional model of the scene; associating regions of the images of the scene with at least one portion of at least one surface of the three-dimensional model of the scene, wherein at least one of the portions is associated with the regions of at least two of the images; at least one view selection criterion, wherein the view selection criteria includes a criterion other than viewpoint; selecting, based on the view selection criteria, at least one of the regions for at least one of the portions; and rendering a multi-view using the selected regions in combination with the three-dimensional model of the scene.

In an optional embodiment, the one or more image providing devices includes an image capture device. In another optional embodiment, the one or more image providing devices includes the storage system. In another optional embodiment, the plurality of images of a scene are still images. In another optional embodiment, the plurality of images of a scene are video images. In another optional embodiment, the plurality of images of a scene are visible images. In another optional embodiment, the plurality of images of a scene are infrared (IR) images. In another optional embodiment, the plurality of images of a scene are two-dimensional images. In another optional embodiment, the plurality of images of a scene are three-dimensional images.

In another optional embodiment, the processing system is further configured to provide the three-dimensional model of the scene by generating the three-dimensional model of the scene using the plurality of images of the scene. In another optional embodiment, the processing system is further configured to provide the three-dimensional model of the scene from the storage system. In another optional embodiment, the processing system is further configured to register the plurality of images of the scene to the three-dimensional model of the scene. In another optional embodiment, the processing system is further configured to determine the camera angle for each of the images of the scene.

In another optional embodiment, the processing system is further configured to derive features from the plurality of images of the scene and the three-dimensional model of the scene to generate one or more maps, and further configured to render the multi-view from the three-dimensional model of the scene in combination with the maps. In another optional embodiment, the maps include a depth map. In another optional embodiment, the maps include an occlusion map. In another optional embodiment, the maps include a silhouette map.

In another optional embodiment, the storage system further provides a collection of information, other than the plurality of images of a scene, as an information layer and the processing system is further configured to use the information layer in combination with the multi-view to generate a combined-view. In another optional embodiment, the processing system is further configured to provide an information layer by calculating from the features of the plurality of images of a scene and the three-dimensional model of the scene a computer vision layer. In another optional embodiment, the information layer includes a dynamic vector layer, the dynamic vector layer including information associated with the scene.

Brief Definition of Terms

The following terms are defined here to assist the reader in understanding this document. The definitions will become further clarified in the context of the description.

Image includes real-time images that are provided while views are being generated and stored images that have been previously captured are provided from storage. Types of images include still, video, visible, infrared, two-dimensional, orthophoto, synthetic aperture radar (SAR), satellite, and range images (three-dimensional).

Camera position and angle, sometimes referred to simply as camera angle includes information such as the three-dimensional position and orientation of the image capture device (camera) in relation to the scene being imaged. The camera angle, also known as image angle or viewpoint, is the three-dimensional position and orientation from which an image was captured.

View selection criteria are the criteria chosen to filter or enhance the available data to present a view to a user. View selection criteria can be specified by a user, specified by default, or automatically derived by the system. One non-limiting example is an algorithm that determines what specific criteria will provide a user with a best view for a given application.

View is generally a two-dimensional representation of a scene.

Multi-view is a view rendered in combination with selecting an appropriate image (or region of an image) for each surface (or portion of a surface) of a 3D model based on the view selection criteria.

Information layer is a collection of information, other than images, associated with a particular 3D model or view and used to enhance or filter a view.

Combined-view is a view rendered from a multi-view in combination with an information layer to present a combination of information from each information layer to a user.

BRIEF DESCRIPTION OF FIGURES

The embodiment is herein described, by way of example only, with reference to the accompanying drawings, wherein.

DETAILED DESCRIPTION

Figure 1A:
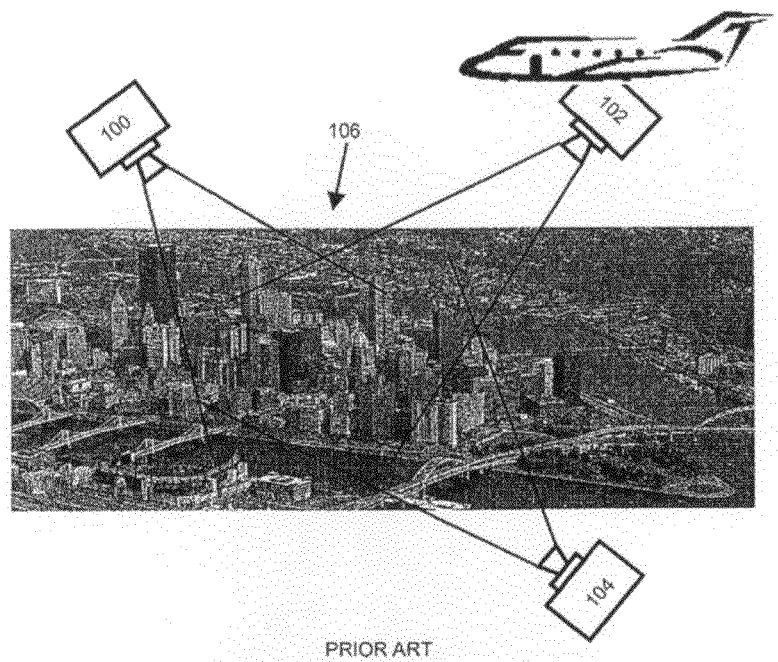
FIG. 1A, image capture of a real scene.
Figure 1B:
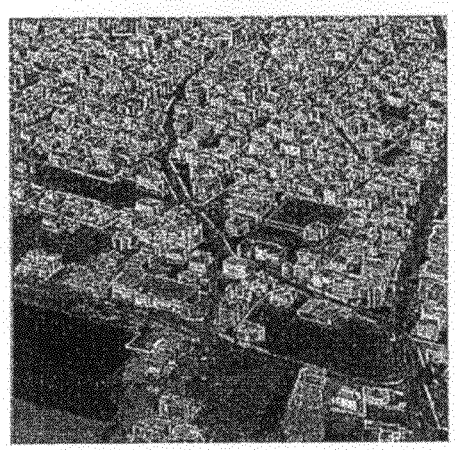
FIG. 1B, an example of image to model registration.
Figure 1C:
FIG. 1C, a rendering using static texture mapping.
Figure 1D:
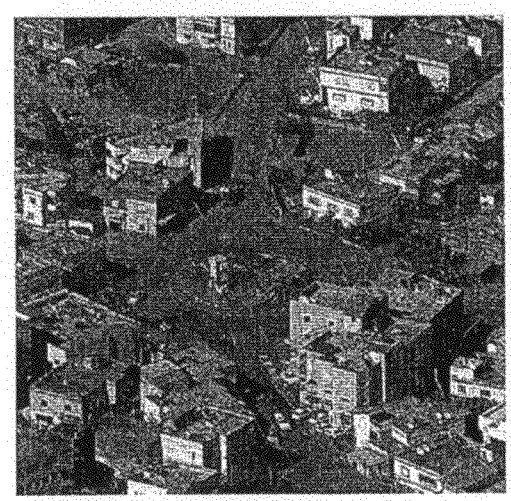
FIG. 1D, a rendering using VDTM.

In military planning, military operations, and similar applications, commanders can have access to a variety of data, from a variety of data sources, available at a variety of times. In one non-limiting example, planning is being done regarding an area of operation. This area of operation can include various terrain, vegetation, roads, and housing. Data can include, but is not limited to, aerial photographs taken during the day, infrared (IR) photographs taken during the day or night, video from vehicle mounted cameras, photographs taken from street-level, digital terrain maps (DTM), digital surface maps (DSM), and satellite imagery (raw images with projection information or orthorectified to orthophotos). This information may be from different times, for example, street-level still photographs a year old, satellite photographs from a week ago, and aerial video from a day ago. At various stages in the planning process, it is desired to have different views of the area of operations. For initial planning, a low-resolution image may be sufficient, but it needs to include the entire area of operations as well as surrounding areas and major terrain features. For detailed planning, the most accurate information may be needed (best resolution), or correlation of JR information to physical features. During execution of an operation, the most recent information, for example live video feeds of the area of operations are required to know the current status and guide the execution of the operations.

To generate views to support scenarios similar to this example, it is not sufficient to choose a viewpoint or generate synthetic images from virtual viewpoints. While conventional methods and systems allow selection of viewpoints and display types, it is desirable to provide a view generated from multiple media and temporal sources that gives the best result for the given view selection criteria. A user, such as the commander in our example, desires to specify not only a viewpoint, but also view selection criteria. The rendered view is generated from the specified viewpoint using the available images according to priorities set by the view selection criteria. In this context, the best view is generated by selecting a texture for each surface, portion of a surface, or even each pixel, from the source images that most closely match the view selection criteria.

A feature of this method and system is that the 3D model and surface textures can derive from the provided images. Depending on the application and view selection criteria, images can be selected or not used, to generate the 3D model and to texture the surfaces of a model for a rendered view. This facilitates a "self-contained" application and improved rendering based on the view selection criteria. In another implementation, a 3D model and images are provided separately.

A non-limiting example of generating a view based on viewpoint and view selection criteria is the case where a commander needs to do detailed planning and specifies as the view selection criteria the most detailed view of a portion of an area of operations. In this example, the viewpoint is placed in a 3D model of the area of operations, and the surfaces visible from that viewpoint are determined. For every surface, the multimedia images associated with that surface are searched to find which associated image will satisfy the selection criteria, in this case, which multimedia image will facilitate generation of the most detailed view of the surface. In our specific example, a ground-level photograph provides high resolution texture to be mapped onto the front of a building, while the most detailed image of the street is a relatively lower resolution aerial video that is used to texture the street. In the context of this document, a view that is generated by combining texture data from two or more images is known as a multi-view. As the commander rotates the viewpoint to look down the street at other buildings, these other buildings are textured using other images from the aerial video from a day ago. As the commander continues rotating the viewpoint to look at buildings on the other side of the street (originally "behind the commander"), aerial video is not available for these surfaces, so satellite photographs from a week ago are used to texture a relatively low-level of detail on these buildings. In this case, a low-level of detail is the most detailed view available. As the commander moves the viewpoint down the street, and then rotates to look at the side of a building, there is no image data for that side of the building, so a blank façade is rendered for that side in the multi-view. In a case where more than one source is available for a surface, the information can be blended, or a virtual indicator used to indicate to the user the status of that surface—for instance, where a newer low-resolution image does not show the same texture as an older high-resolution image. A non-limiting example of blending is the case where the 3D models and associated images are used to provide a combined before and after view of the given target, for instance before and after a target has been attacked to facilitate damage assessment. One technique for implementing blending is using the view selection criteria to grade each image for a given view, and based on the image grade, assign a weight to each image. The image weights are then used to blend the images. Based on this description, other appropriate blending techniques will be obvious to one skilled in the art. Differences in images, surfaces lacking source images for texture, or other issues with the model and/or view generation can be indicated to the user in accordance with the specific application. To continue the example, the commander next wants to view image data sampled at non-visible wavelengths for the area of operations. The commander specifies as the view selection criteria to add infrared (IR) details to the view. Source data with infrared content is used to texture the surfaces of the model and provide this view. Depending on the amount of IR data available, this data is added to the rendering of the view, replacing, enhancing, or blending with the other data being used for the view selection criteria. Enhancing and blending can use a weighted average technique, similar to the technique described above in regards to blending, alone or with additional techniques. In our example, IR data has been requested, so IR images can be given a higher weight than other images associated with the current view. Replacing, enhancing, and blending can be done on the entire view, a selected area of the view, per surface, per portion of a surface, or of a single object in the view. One non-limiting example is the commander specifying IR data for a single house in a view. To enhance the view, the commander next requests additional information to be added to the multi-view, specifically the commander wants to know the street names. A map of street names is combined with the previously generated multi-view to generate a combined-view of the scene.

An objective of the method and system described in this document is to provide views similar to the above-described example. The innovative method and system described below facilitates generation of views of a real scene based on selection of view criteria and the content of multiple types of source data. The viewpoint and at least one other criterion are used to determine which texture to use for each surface, or portion of a surface, of a three-dimensional (3D) model.

Figure 2:
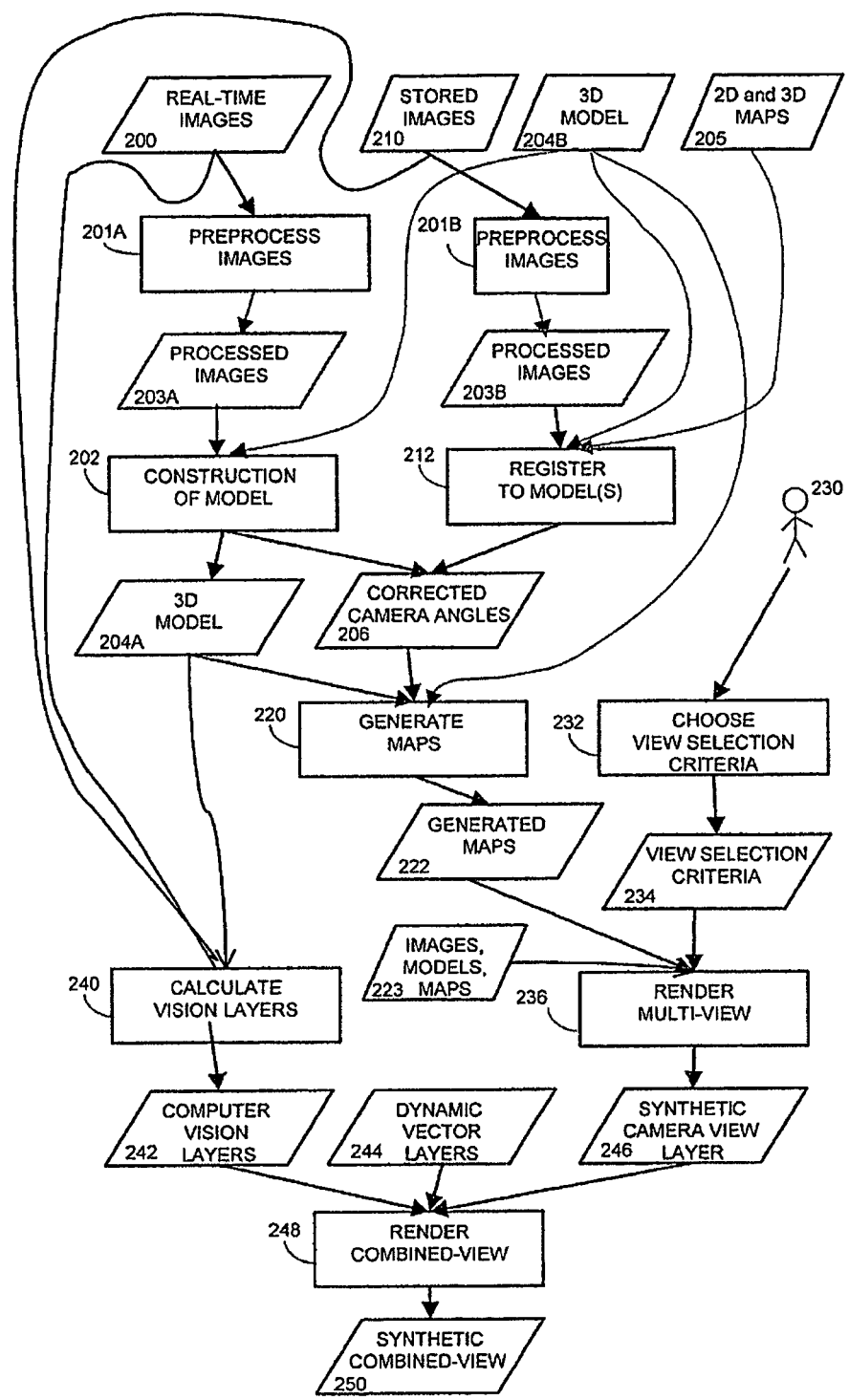
FIG. 2, a flowchart of a method for rendering views.

Referring to FIG. 2, a flowchart of a method for rendering views, the method begins by providing a plurality of images of a real scene. Generally, two types of images can be provided. In one implementation, real-time images 200 are optionally pre-processed 201A and then used in a construction step 202 that produces a 3D model 204A and corrected camera positions and angles 206. In another implementation, stored images 210 are optionally pre-processed 201B and then provided with a 3D model 204B. Note that both 201A and 201B are optional image preprocessing with corresponding outputs of processed images 203A and 203B—the blocks are drawn separately to simplify the diagram and assist with understanding the flow of real-time and stored images. Note that both 204A and 204B are 3D models—the blocks are drawn separately to simplify the diagram and assist with understanding the role of the 3D model in each part of the method. Optionally, 2D maps and 3D maps 205 can be provided. If the 2D and 3D maps need to be registered to a model, they are registered 212 to the 3D models. The stored images 210 are registered to the provided 3D model 204B in block 212, generating corrected camera angles 206. The 3D model, 204A or 204B as appropriate, are used with the corrected camera angles 206 in a map generation block 220 to generate maps 222. A user 230 or another entity chooses 232 view selection criteria 234. The view selection criteria 234 is then used in combination with the maps 222, and 3D model, to select images (real-time images 200/203A, stored images 210/203B, or texture from 2D maps 205 as appropriate) to render a multi-view 236. For clarity block 223 shows the available data being used as input to render a multi-view 236. This multi-view is also known as a synthetic camera view layer 246 and can be provided to the user. Optionally, the 3D model and images are provided to calculate vision layers 240, such as computer vision layers 242. Optionally a dynamic vector layer 244 can be provided. Optionally other layers can be provided depending on the application. Information layers are used to render 248 a synthetic combined-view 250 to present combined information to a user.

In one implementation, the plurality of images of a scene provided to the method are real-time images 200. In this context, real-time images are images that are provided while views are being generated. In a case where the amount of provided real-time images is greater than required for the specific application, the real-time images can be decimated as appropriate for the given application. An image preprocessing step 201A can normalize images at this stage if necessary to adjust the brightness, contrast, color balance, correct lens distortion or adjust other image properties. A model construction step 202 uses the real-time images to generate a 3D model 204A. As additional real-time images are provided, the construction step 202 can use the additional images to generate new sections of the model, update existing sections of the model, and increase the detail of existing sections of the model. To facilitate construction of the 3D model, at least two of the images should be from different camera angles. In one implementation, at least one of the image capture devices is in motion relative to the scene being captured. In another implementation, the images are provided by a plurality of static image capture devices, for example static (fixed/mounted) cameras). In another implementation, an existing 3D model 204B can be input to the model construction step 202 to provide an initial 3D model, to which new sections can be added, updated, and detail increased.

The construction step 202 also calculates corrected camera position and angles 206. $_{[0]}$Calculating the correct camera position and angle for an image registers the image to the model. Refer to the description below for details of registration.

Techniques for generating a 3D model from two-dimensional images are known in the art. One conventional technique is to use structure from motion (SFM) to generate the model. SFM generates a sparse model, and SFM post-processing can be used to increase model detail. Optical flow, linear triangulation, and non-linear triangulation are other conventional techniques that can be used to generate a 3D model. The technique of simultaneous location and mapping (SLAM) can be used to generate a model of an unknown environment (without a priori knowledge) or a known environment (with a priori knowledge) while at the same time keeping track of the current location.

Images can be provided with associated camera position and angle information. In this context, camera angle information, or more simply the camera angle, includes information such as the three-dimensional position and orientation of the image capture device (camera) in relation to the scene being imaged. The camera angle, also known as image angle or viewpoint, is the three-dimensional position and orientation from which an image was captured. In this field, a camera angle is generally provided with the image, but this provided camera angle is generally not sufficiently accurate for the calculations that need to be performed, and so the camera angle needs to be corrected. Techniques to corrected camera angles are known in the art and the algorithms to determine camera information from an image are known as ego motion algorithms. The output of an ego motion algorithm includes the camera information associated with the input image.

In another implementation, the plurality of images of a scene provided to the method are stored images 210. In this context, stored images are images that have been previously captured are provided from storage. In one implementation, the images, including real-time and stored images, are video images. In another implementation, the images are still images, for example, digital photographs. The images can be visible images, which in the context of this document refer to images captured in the visible spectrum and that can be perceived by human vision. In another implementation, the images are infrared (IR) images. In another implementation, the images are three-dimensional (range) images, for example from a RADAR or LADAR image capture device.

In an optional implementation, 2D and 3D maps 205 can be provided. A non-limiting example of a 2D map is an orthophoto that is an orthorectified aerial image set. 2D maps provided by 205 are a source of texture information and are handled similarly to provided images 210. Non-limiting examples of 3D maps include, but are not limited to, digital terrain maps (DTMs) and digital surface maps (DSMs). 3D maps provided by 205 are a source of model information and are handled similarly to provided 3D models 204B. A variety of maps with varying levels of detail, or application specific maps, can be registered 212 to 3D models or used directly if already registered. The information from these maps is then available for eventual selection and rendering of a multi-view 236.

A 3D model 204B is provided, and the stored images 210 are registered to the 3D model 212, generating corrected camera positions and angles 206. Registration includes using techniques to associate images with a 3D model. Techniques for registering images to models are known in the art, and include, but are not limited to automatic, assisted, and manual registration techniques. In the context of associating images with the 3D model, the term image should be understood to include regions of images. In particular where an image is associated with more than one surface, or more than one portion of a surface, only a portion of the image may be associated with each surface (or each portion of one or more surfaces), in contrast to the entire image being associated with a surface. Each of the plurality of images (or regions of images) of the scene is associated with at least one portion of at least one surface of the 3D model. At least one portion of at least one surface of the 3D model is associated with at least two of the plurality of images. In other words, there is redundancy of texture information for at least part of the 3D model. Because at least two images are associated with one portion of the model, view selection criteria will be used to select which image to use to render the desired view, as described below. Note that an image can also be associated with more than one portion of the model. There is an N-to-N relationship between portions of surfaces of the 3D model and images. Registration can also include aligning other models to the 3D model. In one non-limiting example, two 3D models are created from two different video sources. Registration aligns the two 3D models to generate a single unified model of the scene.

In one non-limiting example, the 3D model includes a surface that is the side of a building. A high-resolution digital photograph taken on the street in front of the building from a year ago is registered with the front portion of the surface of the side of the building. This photograph is also registered with the surfaces in the model for the front of the building. A low-resolution video taken from a truck driving down the street includes a frame that is registered with the front portion of the surface of the side of the building. Other frames from this video are registered with the surfaces in the model for the front of the building.

Registering images to the model facilitates internal consistency of the data being used. Views can be generated that are consistent with the model, and a location in a view is known in relation to the model or another location in a view. In the case where the location of the model in the world is known, the model can be registered to the world, and the location in the world of every pixel in a view is known.

Depending on the application, an optional map generation block 220 derives features from the 3D model and images to generate maps 222 such as depth maps, occlusion maps, and silhouette maps. Techniques for map generation are known in the art. Refer to the previously cited research thesis *View-Dependent Texture Projection Mapping for Urban Scene* that includes descriptions, implementation techniques, and additional references for map generation. Briefly, a depth map, also known as a shadow map, includes the range between the camera angle (viewpoint) and each surface in the image and can be used to determine which portions of a surface are visible in an image. From a particular viewpoint, one surface can be in front of another surface, such that portions of the other surface are not visible from the viewpoint. Using a depth map facilitates not having to break up a surface (polygon) into smaller surfaces (a larger number of smaller polygons), which would require increased computations. An occlusion map can be used by a user to designate items to be removed from a view. A non-limiting example is to remove a tree or a truck from a view of a street. This is used to improve the visibility of a view, particularly in the case where model data is not up to date with the scene. A silhouette map includes information on the boundaries of objects in an image and can be used to remove artifacts and facilitate rendering objects in a view.

A user 230 or another entity chooses 232 view selection criteria 234. In the context of this description, view selection criteria are the criteria chosen to filter or enhance the available data to present a view to a user. Based on the view selection criteria, an appropriate image is selected for each of the portions of at least one surface of the 3D model. One technique for selecting images is to compare the view selection criteria to the image metadata. Image metadata includes information about the image that is stored with the image. The view selection criteria and/or the image metadata may require processing to facilitate comparison. High-level view selection criteria may require translation to specific selection criteria. In one non-limiting example, the user chooses a high-level view selection criterion of a detailed infrastructure view. This high-level view selection criterion is translated into specific selection criteria, such as using the highest resolution images and removing transient objects. Image selection techniques are known in the art and based on this description, further variations will be obvious to one skilled in the art.

The view selection criteria is used for prioritizing which image will provide the texture for a portion of a surface (or entire surface, or pixel), to satisfy the view selection criteria for that portion of a surface. The available information 223 including selected images 200/203A, 210/203B are then used, optionally in combination with the maps 205, 222, and 3D model 204A, 204B, to render 236 a view of the scene from the specified viewpoint using the available images to satisfy the view selection criteria. In this context, a view is generally a 2D representation of a scene and a multi-view is a view rendered in combination with selecting an appropriate image (or region of an image) for each surface (or portion of a surface) of a 3D model based on the view selection criteria. The best view is generated by selecting, for each surface, portion of a surface, or even for each pixel, the image that provides the texture most closely matching the view selection criteria. A multi-view is also known as a synthetic camera view layer 246, and can be provided to the user.

Commercially available maps can be particularly useful in supplying general information to render areas of a view would not otherwise have texture information. In a non-limiting example, detailed images are available for a street-level view of a given city block and a commercially available map is used to supply texture for the surrounding buildings.

Depending on the application and choice of view selection criteria, more than one image can be used to render the multi-view. In a case where satisfying the view selection criteria requires more than one image to be used for a surface, multiple images are combined to render the view of that surface.

One non-limiting example is the case where a mixed format display is chosen as the view selection criteria, resulting in visible images being used to generate the 3D model and texture the majority of the rendered view, with infrared data combined with the visible texture to represent gray scale thermal or other data where available in the view.

Images can be normalized at this stage if necessary to adjust the brightness, contrast, color balance, correct lens distortion or adjust other image properties to facilitate the combination of images for a rendered multi-view. For real-time applications, if desired, an effect can be added to the rendered view to distinguish the age of the images being used in the rendering (distinguish recent images from older images). In one non-limiting example, color is used to distinguish the age of the images, with different colors or gradations of a color representing different ages, or age ranges, of the images.

Optionally, the view selection criteria can be used to facilitate selection of images to be used for 3D model construction and/or image registration. This use of view selection criteria 234 in the construction of the 3D model 202 and/or in the registration to models 212 facilitates generation of 3D models and selection or non-use of images that better support the chosen view selection criteria. In a non-limiting example, the view selection criteria includes only newer than a given date, for instance, the date when a given target was destroyed. In this example, only images newer than the given date will be used to construct the 3D model of the given target.

A variety of view selection criteria can be available, depending on the application. General categories of view selection criteria include per view, per pixel in a view, and per model. Non-limiting examples of view selection criteria applied on a per view basis include:

Most recent or from a given time period, such as generally specified for a ground trace (also known as a ground track—the path on the surface of the Earth directly below an aircraft or satellite). Multiple traces may coexist and the most recent trace or traces from a certain time period are used, as appropriate.

Color information, such as RGB color or grayscale.

Camera type, such as CCD.

Wavelength, such as visible or infrared.

Registration accuracy, such as error to the model.

Registration accuracy, such as error to the world coordinate system.

Time of day the picture was taken, such as the case where shadow direction is important.

Non-limiting examples of view selection criteria applied on a per pixel basis include:

Orientation, such as the selected viewpoint being close to a camera position and angle for an image or close to surface normal if static viewing is needed.

Resolution, such as spatial resolution. In this context, spatial resolution is the size of a pixel trace on an object and is affected by a combination of sensor resolution and distance from the sensor to the object. Spatial resolution adjusts to the features of the surface of the object. In one non-limiting example, a pixel trace for an object is larger for surfaces of the object that are not perpendicular to the camera angle.

Visibility, such as applying a depth map to determine which rendered pixels are visible from the selected viewpoint.

Occlusion, such as designating items to be removed from a view.

Real-time monitoring, such as giving priority to the most recent images, including using real-time video as dynamic patches on a rendered view or jumping to the viewpoint of real-time video.

Non-limiting examples of view selection criteria applied on a per model basis, in particular where more than one model is available, include:

Most recent or from a given time period.

Closest source images, such as preferring the images that were used to create a 3D model over images that were not used to create the 3D model.

Registration accuracy, such as error to the world coordinate system.

Model reconstruction, such as the quality of the model.

Model resolution, such as a level of detail of the model.

Operational planning, such as emphasizing infrastructure and detecting and removing transient objects.

If a viewpoint is selected that is close to a camera angle for a given image, depending on the view selection criteria, in some cases the given image can be provided to the user. A result of providing a given image to the user is that the image is consistent from the viewpoint, without the need to construct and render the view.

One or more of the view selection criteria can affect how other view selection criteria are used. One non-limiting example is the case where a detailed view has been chosen as one of the view selection criteria. Even though a high-resolution image is available for an object, if the object is far enough away from the selected viewpoint, then the high-resolution information is less relevant and other selection criteria, such as view direction or more recent images can be a higher priority.

In an optional implementation, information layers are provided. In the context of this description, information layers such as 242, 244, and 246 are a collection of information, other than images, associated with a particular 3D model or view and used to enhance or filter a view. The information layers are used in combination with the multi-view (synthetic camera layer) 246 to generate 248 a synthetic combined-view 250. In this context, a combined-view is a view rendered from a multi-view in combination with an information layer to present a combination of information from each information layer to a user.

In one implementation, the information layer is a dynamic vector layer. A dynamic vector layer includes maps of information that are registered to the 3D model. Examples of dynamic vector layers include, but are not limited to street names, house numbers, legal boundaries, buried mines, and force locations. In one optional implementation, for operational planning purposes a detailed synthetic camera view is combined with selected layers of information from a multi-layer geographic database. In another optional implementation, virtual objects are added to the synthetic camera view to represent data that cannot be seen from the current viewpoint, for example, the position of friendly forces and the locations of image capture devices.

In another implementation, the information layer is a computer vision layer. In this context, a computer vision layer includes analyzing the images to derive a layer of information about objects in the images. One non-limiting example of a computer vision layer is analyzing the images to identify moving objects in the images. Both the images 200, 210 and the 3D model 204A, 204B can be used to calculate computer vision layers. Techniques for calculating computer vision layers are known in the art. Examples of computer vision layers include, but are not limited to a car driving on a road, a person walking, tracking an identified target as the target moves, highlight moving objects in a scene, and the ground trace of a sensor. Another type of computer vision layer is a visibility map calculating what common area can be seen from more than one viewpoint. Depending on the application and the view selection criteria, it may be desired to use the computer vision layer to add information to a multi-view or to remove the computer vision layer information from a multi-view.

Note that this method is not limited to either real-time or stored images as an input. Both real-time and stored images can be provided to this method, and the method can use both types of images for rendering views. In one non-limiting example, both real-time and stored images are provided. The method uses the real-time images to construct a 3D model and then the stored images are registered to the 3D model. In another non-limiting example, stored images are used to construct an initial 3D model and render initial views. Then real-time images become available and are used to update the 3D model and render subsequent, views. In this case as new images (video, still images) are provided, the images are used to update and provide redundant texture information for surfaces that already have associated images and provide texture information for surfaces that do not yet have associated images.

Figure 3:
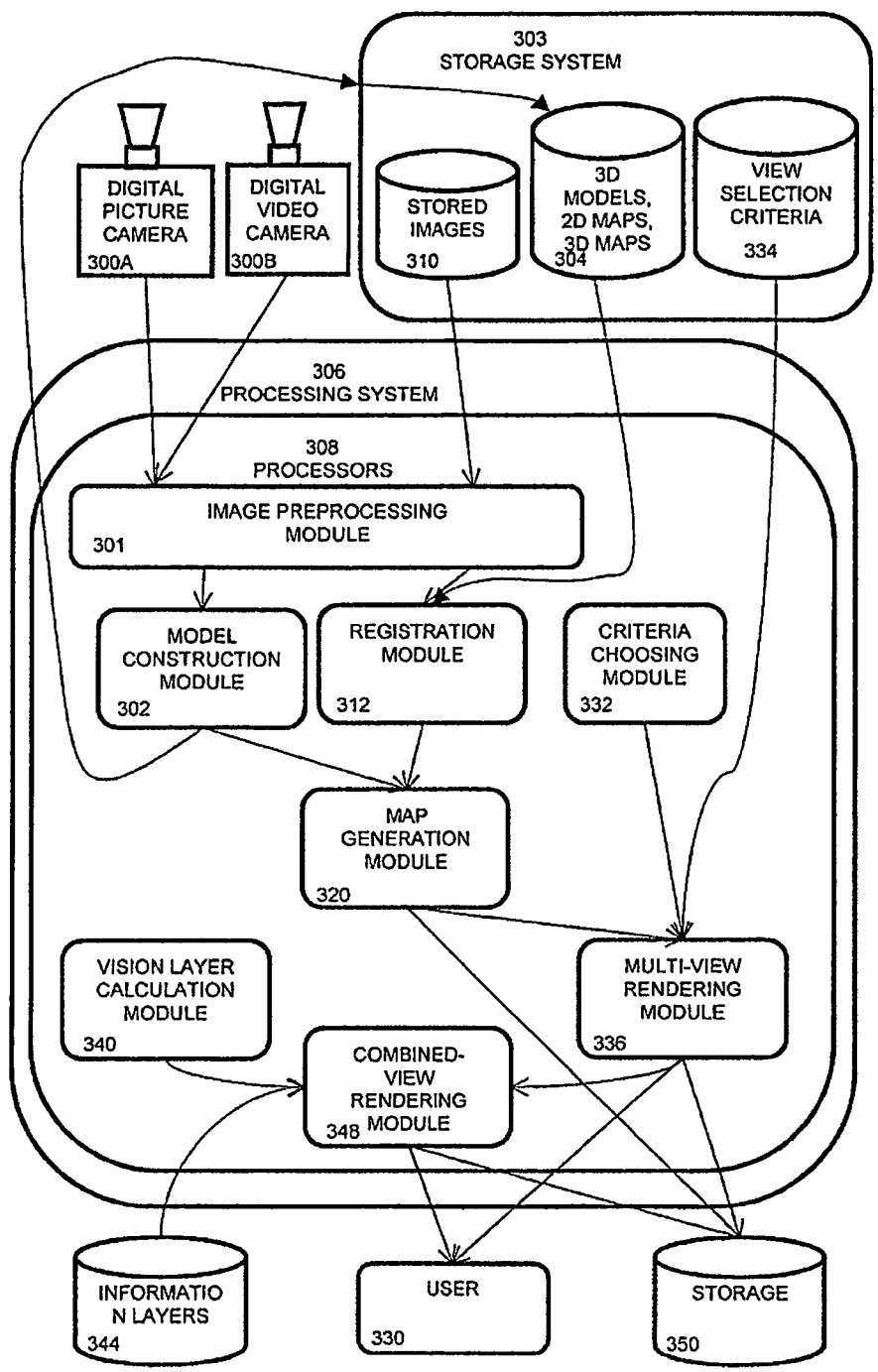
FIG. 3, a diagram of a system for rendering views.

Referring to FIG. 3, a diagram of a system for rendering views, the system inputs a plurality of images of a real scene. A processing system 306 includes one or more processors 308 configured with a variety of processing modules, depending on the implementation. In one implementation, real-time images 300A, 300B are optionally sent to an image preprocessing module 301 and then sent to a construction module 302 that generates one or more 3D models, registers the images, and calculates corrected camera positions and angles for the images. Optionally, the generated 3D models are sent to storage 303 where they can be stored 304 for optional use in further processing. In another implementation, a storage system 303 provides stored images 310 and one or more 3D models 304. The stored images 310 are optionally sent to an image preprocessing module 301 and then, with one or more 3D models 304, are sent to a registration module 312 that generates corrected camera positions and angles. Optionally stored 2D maps and 3D maps 304 are sent to a registration module 312 to be registered to 3D models. The corrected camera angles, 3D model, and images are optionally sent to a map generation module 320 to generate maps. Optionally, the generated maps are sent to storage 350 where they can be stored for optional use in further processing. View selection criteria can be provided 334 or can be selected using a view selection criteria-choosing module 332. A multi-view rendering module 336 uses the view selection criteria in combination with the 3D model and maps to select images (real-time images or stored images as appropriate) and renders a multi-view. This multi-view can be provided to a user 330 or sent to another location, such as storage 350.

Optionally, the 3D model and images are provided to a vision layer calculation module 340 to calculate vision layers, such as computer vision layers. Optionally other information layers 344, such as dynamic vector layers can be provided. Information layers are used in combination with a multi-view in a combined-view rendering module 348 to render a synthetic combined-view. The combined view can be provided to a user 330 or sent to another location, such as storage 350.

One or more image capture devices are configured for providing a plurality of images of a scene. In one implementation, the image capture device 300A captures still images. In another implementation, the image capture device 300B captures video images. One or more image capture devices can provide images can provide images simultaneously. In another implementation, the images are provided from storage 310. The types of images include, but are not limited to visible, infrared (IR), two-dimensional, three-dimensional (range) images, from sources including, but not limited to aerial photographs, video from vehicle mounted cameras, photographs taken from street-level, and satellite imagery (raw images with projection information or orthorectified to orthophotos).

As described earlier, real-time images are images that are provided while views are being generated. In this context, real-time refers to performing steps such as capturing and processing images with a delay according to the limitations of the handling system, typically with a delay of a fraction of a second. As image capture devices (also known in this field more generally as sensors) 300A, 300B capture images, the images are sent to the model construction module 302, which generates one or more 3D models, and includes image registration, and calculating corrected camera angles, as described above. As real-time images continue to be provided to the model construction module 302, one or more 3D models can be constructed, updated, and increased in detail. Similarly, as the map generation module 320 continues to receive the corrected camera angles, 3D models, and images, the map generation module 320 continues to generate, update, and increase the detail of the maps being generated.

Stored images 310 and one or more 3D models 304 are provided from storage. Note that for clarity in this description, the singular term 3D model is often used. The term 3D model should be understood to include one or more 3D models, a compound model made up of one or more models, implementations where a single model is processed as multiple models (a single model is broken apart for piece-wise processing), and implementations where multiple models are processed (piece-wise or in parallel) for use in rendering a common scene.

The model construction module 302 (for real-time images) and registration module 312 (for stored images) include registering the images to a 3D model by associating each of the plurality of images of the scene with at least one portion of at least one surface of one or more 3D models of the scene. At least one of the portions of at least one surface of one or more 3D models of the scene is associated with at least two of the plurality of images. The images can be stored in a variety of locations, depending on the application. Locations include, but are not limited to, local storage associated with the processing system, storage on a network with the processing system, or any other storage that is operationally connected to the processing system. When images are registered to a 3D model, the model does not have to be associated with the images directly. Location information for the image can be associated with a surface (or portion of a surface) so that when the system needs to access the images registered to a surface, the system can use the associated location information to access the images. Techniques for referencing data, including using pointers, handles, and links, are known in the art.

The one or more processors are configured to generate maps using the plurality of images of a scene and one or more 3D models of the scene. Types of maps include, but are not limited to depth maps, occlusion maps, and silhouette maps.

Note that a variety of implementations for modules and processing are possible, depending on the application. In an implementation where two or more image capture devices provide images simultaneously, more than one of the described modules can be used for processing the images. Similarly, more than one module can be implemented for processing of data. In one implementation, the model construction module 302 can be implemented as described to include 3D model generation, image registration, and calculating corrected camera angles. In another implementation, each of the processes of 3D model generation, image registration, and calculating corrected camera angles can be implemented as one or more modules. Based on this description, further variations will be obvious to one skilled in the art.

The source of view selection criteria depends on the application. In one implementation, the view selection criteria are pre-determined and can be provided from storage 334. In another implementation, a view selection criteria choosing module 332 facilitates a user, or another entity, choosing the view selection criteria. In the case where a user chooses the view selection criteria, the view selection criteria-choosing module 332 can provide a graphical user interface (GUI) or other interface as appropriate for the application. In a case where another entity chooses the view selection criteria, the view selection criteria-choosing module 332 can provide that interface. In one non-limiting example, an algorithm analyses the available images and determines view selection criteria based on the characteristics of the images and the pre-determined requirements of the application. Note that choosing view selection criteria also includes deselecting criteria that have already been chosen. Choosing and deselecting criteria facilitates a user specifying and generalizing the selected view.

The one or more processors are configured to select, based on the view selection criteria, an appropriate image for at least one portion of at least one surface of the one or more 3D models of the scene. The selected images, one or more 3D models, and optionally maps of the scene are used by the multi-view rendering module 336 to render a multi-view. In another implementation, the multi-view is rendered in combination with one or more maps.

In an optional implementation, images and 3D models are used by a vision layer calculation module 340 to calculate vision layers, such as computer vision layers for use as an information layer. Calculated information layers, for example a computer vision layer, and provided layers 344, for example dynamic vector layers, are used in combination with a multi-view (synthetic camera layer) in a combined-view rendering module 348 to render a synthetic combined-view.

Views, both multi-views and combined views, can be provided to a user 330 or sent to another location, such as storage 350. In the case where stored images are being processed, a set of pre-defined views may be desired. These pre-defined views can be generated by the system and sent for storage and subsequent viewing by a user.

In the case where real-time images are being processed, a user can choose view selection criteria as desired, within the limitations of the system implementation, and independently of the input images. Depending on the application, this feature of processing real-time images facilitates the real-time updating of the view being provided to the user. As new images are input to the system, they are processed and the resulting view provided to the user. In one non-limiting example, aerial cameras circle an area of operation. These aerial cameras initially circle the area of operation and provide low-resolution images of the entire area of operations. As the aerial cameras continue to circle the area of operation, the cameras zoom in to provide higher resolution images of smaller parts of the area of operation. As a user is viewing a location in the area of operations, they are initially provided a low-resolution view of the location. As the higher resolution images are captured and processed, the view provided to the user is updated to provide more detail. In another non-limiting example, a user is provided with a view of several streets showing the buildings and infrastructure. The user desires to know what events are occurring on one of the streets, and orders a video camera deployed to that street. The images from the video camera are relayed to the system, processed, and the live video is overlaid on the view being provided to the user.

The implementation of the storage system 303 depends on the requirements of the application. In one implementation, a single storage system provides storage for all data, including images 310, 3D models 304, 2D maps 304, 3D maps 304, view selection criteria 334, information layers 344, and general storage 350. In another implementation, the storage system includes a plurality of storage devices operationally connected to the processing system to provide the appropriate data. Based on this description, further variations will be obvious to one skilled in the art.

This method and system are not limited to a single set of view selection criteria. A plurality of users can each choose view selection criteria, and a multi-view or combined-view can be rendered for each user. In some cases, the application can include a pre-defined set of selection criteria for some users, or views being sent to users as they are available. In other cases, users at a remote site can request views from the system, for example to a field unit that requires a combined view from a centrally located system. This system can be implemented to provide views using push or pull techniques, depending on the application.

It will be appreciated that the above descriptions are intended only to serve as examples, and that many other embodiments are possible within the scope of the present invention as defined in the appended claims.

What is claimed is:

1. A method for rendering views, comprising the steps of:
   (a) providing a plurality of images of a scene;
   (b) providing a three-dimensional model of the scene;
   (c) associating regions of said plurality of images of the scene with at least one portion of at least one surface of said three-dimensional model of the scene, wherein at least one of the portions is associated with said regions of at least two of said plurality of images;
   (d) providing at least one view selection criterion, wherein said view selection criteria includes a criterion other than viewpoint;
   (e) selecting, for each of at least one portions, at least one of said regions, said selecting based on prioritizing regions for each portion to satisfy said view selection criteria as a function of a current viewpoint;
   (f) rendering a multi-view using the selected regions in combination with said three-dimensional model of the scene; and
   (g) dynamically repeating steps (e) and (f) such that the selected regions for each of said at least one portions varies as a function of the current viewpoint.

2. The method of claim 1 wherein said plurality of images of a scene are provided from the group consisting of:
   (a) still images;
   (b) video images;
   (c) visible images;
   (d) infrared (IR) images;
   (e) two-dimensional (2D) images; and
   (f) three-dimensional (3D) images.

3. The method of claim 1 wherein providing a three-dimensional model of a scene includes generating a three-dimensional model of the scene using said plurality of images of a scene.

4. The method of claim 1 wherein associating each of said regions of said images of the scene with at least one portion of at least one surface of said three-dimensional model of the scene further includes registering said plurality of images of a scene to said three-dimensional model of the scene.

5. The method of claim 4 wherein registering said plurality of images of a scene to said three-dimensional model of the scene further includes determining the camera angle for each of said images.

6. The method of claim 1 wherein at least one view selection criterion is selected from the group consisting of: (a) a given time period; (b) registration accuracy; and (c) resolution.

7. The method of claim 1 further including deriving features from said plurality of images of a scene and said three-dimensional model of the scene to generate one or more maps, and wherein rendering a multi-view further includes using said maps in combination with said three-dimensional model of the scene to render said multi-view.

8. The method of claim 7 wherein said maps is selected from the group consisting of: (a) a depth map; (b) an occlusion map; and (c) a silhouette map.

9. The method of claim 1 further including providing one or more maps, said one or more maps including the scene, and wherein rendering a multi-view further includes using said one or more maps in combination with said three-dimensional model of the scene to render said multi-view.

10. The method of claim 9 wherein said one or more maps is selected from the group consisting of:
 (a) a digital terrain map (DTM);
 (b) a digital surface map (DSM); and
 (c) satellite imagery, said satellite imagery including raw images with projection information and raw images orthorectified to orthophotos.

11. The method of claim 1 further including providing a collection of information, other than said plurality of images of a scene, as an information layer and further including using said information layers in combination with said multi-view to generate a combined-view.

12. The method of claim 11 wherein said information layer includes a computer vision layer calculated from the features from said plurality of images of a scene and said three-dimensional model of the scene.

13. The method of claim 11 wherein said information layer includes a dynamic vector layer, said dynamic vector layer including information associated with said scene.

14. A system for rendering views, comprising:
 (a) one or more image providing devices configured for providing a plurality of images of a scene; and
 (b) a processing system containing at least one processor and configured for:
 (i) providing a three-dimensional model of the scene;
 (ii) associating regions of said plurality of images of the scene with at least one portion of at least one surface of said three-dimensional model of the scene, wherein at least one of the portions is associated with said regions of at least two of said plurality of images; (iii) providing at least one view selection criterion, wherein said view selection criteria includes a criterion other than viewpoint; (iv) selecting at least one of said regions for each of at least one portions, said selecting based on prioritizing regions for each portion to satisfy said view selection criteria as a function of a current viewpoint; (v) rendering a multi-view using the selected regions in combination with said three-dimensional model of the scene; and (vi) dynamically repeating steps (iv) and (v) such that the selected regions for each of said at least one portions varies as a function of the current viewpoint.

15. The system of claim 14 wherein said one or more image providing devices is selected from the group consisting of: (a) an image capture device; and (b) a storage system.

16. The system of claim 14 wherein said plurality of images of a scene are selected from the group consisting of: (a) still images; (b) video images; (c) visible images; (d) infrared (IR) images; (e) two-dimensional (2D) images; and (f) three-dimensional (3D) images.

17. The system of claim 14 wherein said processing system is further configured to provide said three-dimensional model of the scene from a storage system.

18. The system of claim 14 wherein said wherein at least one view selection criterion is selected from the group consisting of:
 (a) a given time period;
 (b) registration accuracy; and
 (c) resolution.

19. The system of claim 14 wherein said processing system is further configured to derive features from said plurality of images of the scene and said three-dimensional model of the scene to generate one or more maps, and further configured to render said multi-view from said three-dimensional model of the scene in combination with said maps.

20. The system of claim 14 wherein said processing system is further configured to render said multi-view from said three-dimensional model of the scene in combination with one or more provided maps.

* * * * *